United States Patent [19]

Seibert et al.

[11] Patent Number: 4,729,609
[45] Date of Patent: Mar. 8, 1988

[54] SLIP-CONTROLLED BRAKE SYSTEM WITH FAST-FILL CYLINDER

[75] Inventors: Wolfram Seibert, Pfungstadt; Norbert Ocvirk, Offenbach; Juergen Schonlau, Niedernhausen; Guenter Trach, Offenbach, all of Fed. Rep. of Germany

[73] Assignee: Alfred Teves GmbH, Frankfurt am Main, Fed. Rep. of Germany

[21] Appl. No.: 888,999

[22] Filed: Jul. 24, 1986

[30] Foreign Application Priority Data

Aug. 24, 1985 [DE] Fed. Rep. of Germany ....... 3530289

[51] Int. Cl.⁴ .............................................. B60T 8/32
[52] U.S. Cl. .................................. 303/114; 60/547.1; 60/574; 60/578; 188/358; 303/50; 303/119
[58] Field of Search ..................... 303/50–56, 303/114, 119, 92, 100, 116, 113; 188/355–359, 345, 347; 60/582, 574–578, 545, 547.1, 564, 550

[56] References Cited

U.S. PATENT DOCUMENTS

| | | | |
|---|---|---|---|
| 4,510,753 | 4/1985 | Steer | 60/578 |
| 4,586,591 | 5/1986 | Belart | 188/358 |
| 4,600,243 | 7/1986 | Belart et al. | 188/345 X |
| 4,611,858 | 9/1986 | Belart | 188/345 X |
| 4,641,891 | 2/1987 | Belart | 188/347 X |
| 4,641,894 | 2/1987 | Belart | 303/116 X |
| 4,643,490 | 2/1987 | Belart | 303/119 X |
| 4,657,315 | 4/1987 | Belart | 303/113 |
| 4,659,152 | 4/1987 | Reinartz et al. | 60/574 X |
| 4,667,466 | 5/1987 | Mizusaki | 60/574 X |
| 4,671,066 | 6/1987 | Belart | 60/574 X |
| 4,678,242 | 7/1987 | Belart | 303/114 X |
| 4,681,375 | 7/1987 | Belart | 303/114 |
| 4,682,824 | 7/1987 | Burgdorf | 303/114 X |
| 4,687,259 | 8/1987 | Reinartz et al. | 303/114 |

FOREIGN PATENT DOCUMENTS

| | | | |
|---|---|---|---|
| 3338322 | 5/1985 | Fed. Rep. of Germany . | |
| 2157380 | 10/1985 | United Kingdom | 303/114 |
| 2160274 | 12/1985 | United Kingdom | 60/550 |

*Primary Examiner*—Douglas C. Butler
*Attorney, Agent, or Firm*—James B. Raden; Robert P. Seitter

[57] ABSTRACT

For attaining an abrupt change in ratio, in a slip-controlled brake system for automotive vehicles, the chamber (11) of a fast-fill cylinder (4) is connected to a plunger chamber (41) of the braking pressure generator (1) which is acted upon by the booster piston (40), while the pressure line (7) leading from the plunger chamber (41) to the fast-fill cylinder (4) contains a pressure-controlled directional control valve (8) governing a pressure-fluid conduit to the pressure-supply reservoir (31). The annular chamber (50) of the fast-fill cylinder (4) is connected by way of a return line (55) to the pressure-supply reservoir (31) and with the prechamber (18) of the master cylinder (15) by way of a pressure line (56), while a pressure-controlled two-way/two-position directional control valve (9) with a non-return valve connected in parallel thereto is arranged in the return line (55). Upon failure of the auxiliary-energy supply system (2), the stepped piston (12), the valve (8) and the piston (51) of the intermediate member (39) remain in their inactive position so that the pressure build-up in the brake circuits (36, 37) is affected through the pistons (32, 33) exclusively.

5 Claims, 1 Drawing Figure

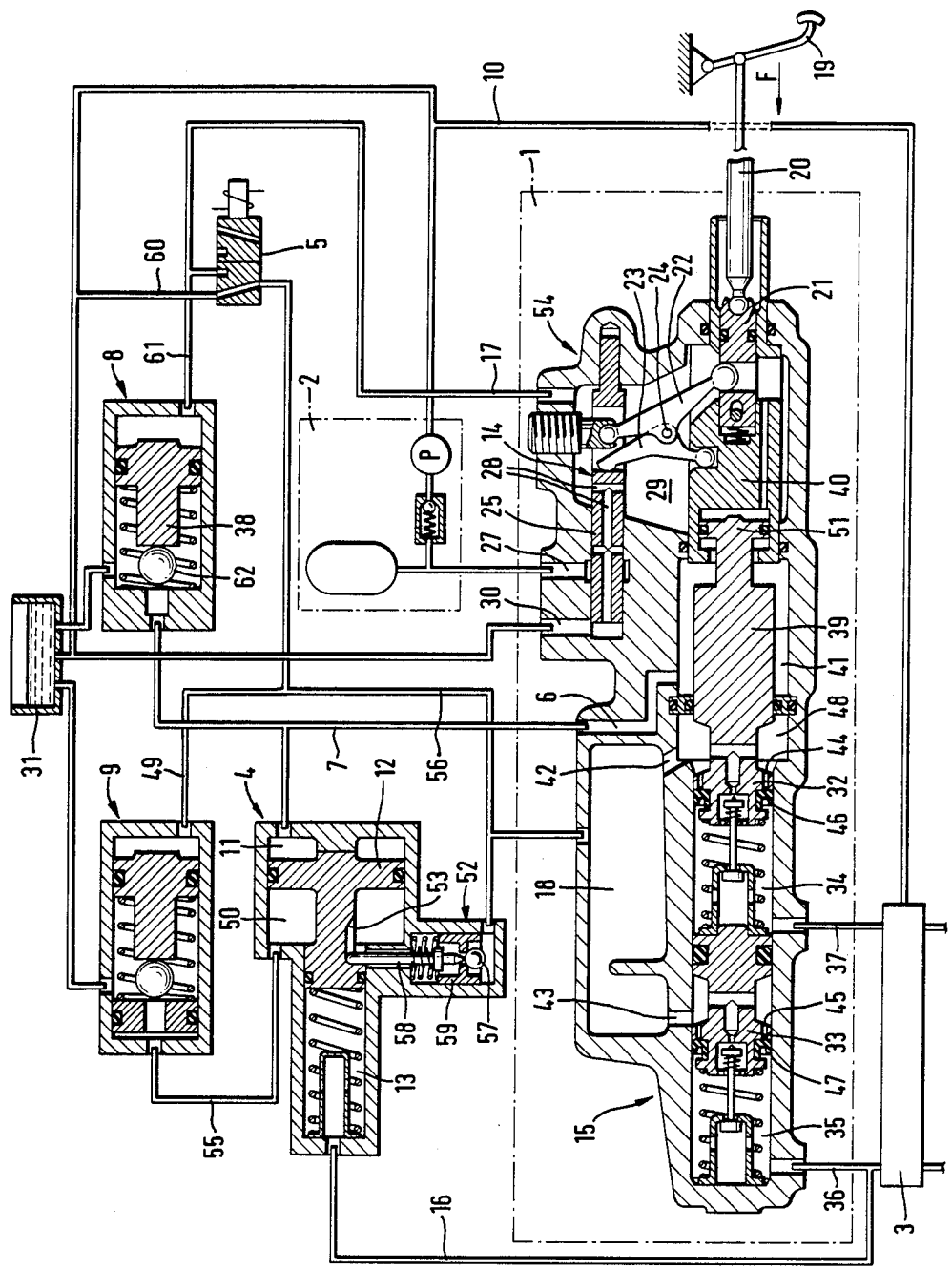

SLIP-CONTROLLED BRAKE SYSTEM WITH FAST-FILL CYLINDER

BACKGROUND OF THE INVENTION

The present invention relates to a slip-controlled brake system for automotive vehicles comprising a braking pressure generator with a master cylinder and a brake power booster connected to an auxiliary-energy supply system, wherein at least two brake circuits are provided, one thereof being connected to a fast-fill cylinder.

In patent application No. P 350,870.99, there is provision of a fast-fill cylinder enabling an abrupt change in ratio if the hydraulic brake power booster or the auxiliary-energy supply fails and it is only the pedal force of the vehicle operator that is left available for the braking action. Although the fast-fill cylinder in this brake system is inserted in the static brake circuit, it bears the disadvantage that exact positioning of the booster piston is a problem.

It is an object of the present invention to provide a brake system of the type described which, on booster failure, operates with a reduced master brake cylinder surface and which affords exact positioning of the brake pedal during the introduction of pressure fluid from the hydraulic booster into the brake circuits (dynamic fluid flow during braking pressure control).

SUMMARY OF THE INVENTION

This object achieved according to the present invention in that the chamber in front of the large stage of the stepped piston of the fast-fill cylinder is connected to a plunger chamber acted upon by the booster piston, while the pressure line leading from the plunger chamber to the fast-fill cylinder contains a valve which governs a pressure-fluid connection to the pressure-supply reservoir as a function of the controlled pressure in the booster chamber.

In this arrangement, advantageously, the annular chamber behind the large stage of the stepped piston of the fast-fill cylinder communicates by way of a return line with the pressure-supply reservoir while it is connected by way of a pressure line with the prechamber of the master cylinder with a valve being inserted into the return line which governs a pressure-fluid connection to the pressure-supply reservoir as a function of the pressure in the prechamber, while in addition a pressure line from the prechamber to the annular chamber behind the large stage of the fast-fill cylinder accommodates a valve whose valve member is displaceable by the stepped piston.

Expediently, the stepped piston is furnished with a ramp cooperating with a tappet which moves the valve member, with the assigned valve seat being part of a piston which is applied by the pressure in the line leading to the prechamber, on the one hand, and by the pressure in the annular chamber of the fast-fill cylinder, on the other hand. The valve interposed into the pressure line connecting the plunger chamber with the fast-fill cylinder is designed as a pressure-controlled two-way/two-position directional control valve which connects the plunger chamber to the pressure-supply reservoir on failure of the pressure in the control line communicating with the booster chamber.

Preferably, the annular chamber behind the large stage of the stepped piston of the fast-fill cylinder is in communication by way of a return line with the pressure-supply reservoir, a pressure-controlled two-way/two-position directional control valve with a non-return valve connected in parallel being inserted into the return line. The valve closing the pressure-fluid conduit from the fast-fill cylinder to the pressure-supply reservoir in the event of delivery of pressure fluid from the booster chamber through the pressure line into the prechamber, while, however, it permits supply of pressure fluid out of the pressure-supply reservoir into the annular chamber of the fast-fill cylinder.

BRIEF DESCRIPTION OF THE DRAWING

The present invention can be utilized in various embodiments. One embodiment is illustrated in more detail in the accompanying drawing in which the single FIGURE depicts the circuit configuration of a multiple-circuit hydraulic brake system which includes the actuating device, a modulator, an auxiliary-energy supply system, a supply reservoir for the pressure fluid, a fast-fill cylinder and a variety of valves.

DETAILED DESCRIPTION

The brake system (with slip control) for an automotive vehicle includes a hydraulic unit or braking pressure generator 1, with auxiliary-energy supply system 2 and a valve block or modulator 3 in which the electromagnetic pressure-increasing and pressure-decreasing valves allocated to a wheel or an axle, respectively, are comprised, a fast-fill cylinder 4, the valves 8 and 9 and the main valve 5. The sensors for measuring the wheel speeds and the electronics for producing the control signals for the valves of the modulator 3 required for such systems are not illustrated. The actuating device, which is the braking pressure generator 1, is substantially subdivided into a booster 54 with brake valve 14, a tandem master cylinder 15 with a pertinent prechamber 18, and a plunger chamber 41.

The brake valve 14 is designed as a slide valve in the embodiment described herein. On depression of the brake pedal 19, the pedal force F is transmitted by way of a push rod 20 and a push-rod piston 21 onto an arrangement consisting of two levers 22, 23 articulated by way of a bolt 24, and from there onto the control piston 25 of the brake valve 14. As the force required for displacement of the booster piston 40 of the brake valve 14 is considerably higher than that required for displacement of the control piston 25, the control piston 25 will be shifted to the left at first, that is when the lever 22 is turned in its joint 24 by application of the force F. Thereby, the auxiliary-energy source 2 will be connected with the booster chamber 29 through the inlet 27 and the inner bores 28 in the control piston 25. Shortly before, the opening 30 had been closed, through which the booster chamber 29 was in communication with a pressure-compensating and supply reservoir 31, with the brake not applied. The pressure developing in the pressure chamber 29 likewise acts on the booster piston 40 and displaces it to the left. The cylinder pistons 32 and 33 of the tandem master cylinder 15 will now be displaced also so that braking pressure develops in the associated pressure chambers 34, 35 as well as in the static brake circuits 36, 37 connected thereto.

The intermediate member 39 connecting the booster piston 40 with the tandem master cylinder pistons 32, 33 and forming a unit together with the master cylinder piston 32 is encompassed by a plunger chamber 41 which is in connection by way of a channel 6 and a pressure line 7 with a valve 8 provided as a pressure-controlled two-way/two-position directional control valve.

In the event of response of brake slip control due to an incipient locked condition at one or more of the wheels, the solenoid valve 5, that is the so-termed main valve, will be energized, whereby simultaneously the connection 28 leading to the supply reservoir 31 under atmospheric pressure will be closed and the flow path 17, 56 from the booster chamber 29 into the prechamber 18 will be opened. This is the onset of dynamic fluid flow into the brake circuits 36, 37. The hydraulic medium which is under increased pressure due to the auxiliary-energy supply flows out of the prechamber 18 through the connecting channels 42, 43 to the secondary sides of the two master cylinder pistons 32, 33 and from there by way of the pistons and through the supply bores 44, 45 with the adjoining sealing lips 46, 47 serving as non-return valves into the pertinent working chambers 34, 35.

Signals are generated by means of a control unit as a function of the rotational behavior of the individual wheels which is determined by means of sensors, the said signals serving to operate the electromagnetic pressure-increasing and pressure-decreasing valves in the modulator 3.

In order to reduce the braking pressure in the static brake circuits 36, 37 upon an imminent locked condition of a wheel, valves in the modulator 3 will, after their excitation, establish by way of the return line 10 a connection between the wheel brake cylinders and the supply reservoir 31 under atmospheric pressure, and thereby decrease braking pressure. In a similar manner, the pressure in the prechamber 18 will be reduced through the main valve 5 and the line 56, 60 as soon as this valve becomes de-energized. When the main valve 5 is de-energized, dynamic fluid flow into the prechamber 18 is interrupted.

In the event of the brake system being intact and displacement of the booster piston 40 in actuating direction (to the left), piston 40 plunges into the plunger chamber 41 and urges the pressure fluid available there through the channel 6 and the pressure line 7 into the chamber 11 of the fast-fill cylinder 4. Thereupon, the stepped piston 12 of the fast-fill cylinder 4 will move to the left and displace the pressure fluid existing in the chamber 13 in front of the small stage of the stepped piston 12 through the pressure line 16 into the brake circuit 36. In doing so, the valve 8 remains closed since the fluid prevailing in the pressure line 17 is also subject to that pressure which is prevailing in the booster chamber 29, and urges the piston 38 of the valve 8 to the left, in consequence whereof the closure member 62 closes the valve passage to the pressure-supply reservoir 31.

When the main valve 5 is changed over (in the event of brake slip control), there is established a pressure fluid connection between the booster chamber 29 and the prechamber 18 and likewise through the signal line 49 to the valve 9 (pressure-controlled two-way/two-position directional control valve with non-return valve inserted in parallel) which closes its pressure-fluid passage and interrupts the connection between the annular chamber 50 of the fast-fill cylinder 4 and the pressure-supply reservoir 31, the stepped piston 12 being blocked as a result.

When the energy supply of the braking pressure generator 1 is intact, the controlled pressure prevailing in the booster chamber 29 displaces the intermediate member 39 and, respectively, the piston 51 connected therewith to the left and, moreover, interrupts the communication between the plunger chamber 41 and the pressure-supply reservoir 31 by causing the valve 8 inserted into the pressure line 7 to adopt its closed position. On displacement of the booster piston 40, pressure fluid out of the plunger chamber 41 is displaced through the channel 6 and the pressure line 7 into the chamber 11 so that, simultaneously, pressure fluid is urged out of the chamber 13 into the brake circuit 36.

In the event of failure of the energy supply 2, the stepped piston 12, the valve 8 and the piston 51 (at the booster piston 40) remain in their inactive position so that braking is dependent on the pedal force alone which acts on the master cyliner pistons 32, 33.

Upon an imminent locked condition (control action), the main valve 5 will be switched so that the valve 9 assumes its closed position and uncouples the annular chamber 50 from the pressure-supply reservoir 31. When the reserve stroke is exceeded, the valve 52 will be actuated through the ramp 53, as a result whereof the controlled pressure enters through the valve 52 into the annular chamber 50 and slides the stepped piston 12 back until so much pressure fluid has returned from the chamber 11 into the plunger chamber 41 that the brake pedal assumes a precisely defined position.

We claim:

1. A slip-controlled brake system for automotive vehicles, said system comprising a brake pressure generator including a master cylinder and a brake power booster, the master cylinder and brake power booster being operatively connected by a plunger slideably disposed in a plunger chamber, the brake power booster having a piston slideably received in and acting on the plunger chamber, an auxiliary energy-supply system connected to a booster chamber in the brake power booster, at least two brake circuits connected to the master cylinder, a fast-fill cylinder having a stepped piston including larger and smaller stages, the smaller stage being slideably received in a smaller portion of the fast-fill cylinder, the smaller portion of the fast-fill cylinder being connected to one of the brake circuits, the larger stage being slideably received in a larger portion of the fast-fill cylinder and forming first and second fluid chambers therein, one of the first and second chambers being connected to the plunger chamber by a first fluid pressure line, the first fluid pressure line also being connected to a fluid supply reservoir, and a pressure responsive valve between said one of the first and second chambers of the fast-fill cylinder and the fluid supply reservoir, the pressure responsive valve being connected to the booster chamber in the brake power booster so that the pressure responsive valve governs the connection between said one of the first and second chambers of the fast-fill cylinder and the fluid supply reservoir as a function of the pressure in the booster chamber.

2. The slip-controlled brake system as claimed in claim, 1 wherein the other of the first and second chambers in the fast-fill cylinder communicates with the pressure-supply reservoir by way of a return line and is connected by way of a second pressure line with a prechamber associated with the master cylinder, a non-return balve inserted into the return line for governing a pressure-fluid conduit to the pressure-supply reservoir as a function of the pressure in the prechamber, said second pressure line accommodating a valve member whose valve is moved by the stepped piston.

3. The slip-controlled brake system as claimed in claim 2, wherein the stepped piston includes a ramp cooperating with a tappet which moves the valve member, the valved seat associated with the valve member being part of a piston supplied with the pressure in the second pressure line and by the pressure in the other of the first and second chambers of the fast-fill cylinder.

4. The slip-controlled brake system as claimed in claim 3, wherein the pressure responsive valve is a pressure-controlled two-way/two-position directional control valve which connects the plunger chamber to the pressure-supply reservoir on failure of the pressure in a control line communicating with the booster chamber.

5. The slip-controlled brake system as claimed in claim 4, wherein the other chamber of the fast-fill cylinder is in communication by way of the return line with the pressure-supply reservoir, the pressure-controlled two-way/two-position directional control valve with the non-return valve being connected in parallel, said non-return valve closing the pressure-fluid conduit from the fast-fill cylinder to the pressure-supply reservoir in the event of delivery of pressure fluid from the booster chamber through the second pressure line into the prechamber, while permitting supply of pressure fluid out of the pressure-supply reservoir into the other chamber of the fast-fill chamber.

* * * * *